United States Patent
Liu et al.

(10) Patent No.: US 8,940,208 B2
(45) Date of Patent: Jan. 27, 2015

(54) FABRICATING METHOD OF FLEXIBLE DISPLAY AND FLEXIBLE DISPLAY

(75) Inventors: Chan-Jui Liu, Hsinchu (TW); Chih-Hung Tsai, Changhua County (TW); Chun-Hsiang Fang, Yilan County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/337,289

(22) Filed: Dec. 27, 2011

(65) Prior Publication Data
US 2013/0071650 A1    Mar. 21, 2013

(30) Foreign Application Priority Data
Sep. 21, 2011  (TW) .............................. 100133989 A

(51) Int. Cl.
| | | |
|---|---|---|
| *B28B 7/14* | (2006.01) | |
| *G09F 9/30* | (2006.01) | |
| *B32B 37/26* | (2006.01) | |

(52) U.S. Cl.
CPC ................ *G09F 9/301* (2013.01); *B32B 37/26* (2013.01); *B32B 2037/268* (2013.01); *B32B 2457/20* (2013.01)
USPC ....................................................... 264/163

(58) Field of Classification Search
CPC ............................................... B32B 2037/268
USPC ........................................................ 264/163
See application file for complete search history.

(56) References Cited

U.S. PATENT DOCUMENTS

| | | |
|---|---|---|
| 7,253,087 B2 | 8/2007 | Utsunomiya |
| 7,466,390 B2 | 12/2008 | French et al. |
| 7,785,988 B2 | 8/2010 | Amundson et al. |
| 7,807,551 B2 | 10/2010 | Huang et al. |

(Continued)

FOREIGN PATENT DOCUMENTS

| | | |
|---|---|---|
| CN | 1883061 | 12/2006 |
| CN | 101833215 | 9/2010 |

(Continued)

OTHER PUBLICATIONS

"Office Action of Taiwan counterpart application" issued on Dec. 12, 2013, p. 1-6.

(Continued)

*Primary Examiner* — Yogendra Gupta
*Assistant Examiner* — Kimberly A Stewart
(74) *Attorney, Agent, or Firm* — Jianq Chyun IP Office

(57) ABSTRACT

A fabricating method of a flexible display is provided. A release layer is formed on a carrier substrate. The release layer is patterned to form a patterned release layer. A flexible substrate is formed on the patterned release layer, wherein the flexible substrate covers the patterned release layer and a portion of the flexible substrate contacts the carrier substrate. An adhesive force between the patterned release layer and the flexible substrate is larger than an adhesive force between the patterned release layer and the carrier substrate. A device layer is formed on the flexible substrate. A display layer is formed on the device layer. The flexible substrate and patterned release layer are cut simultaneously. The patterned release layer being cut is separated from the carrier substrate, wherein the flexible substrate, the device layer and the display layer which have been cut are sequentially disposed on the separated patterned release layer.

14 Claims, 7 Drawing Sheets

(56) References Cited

U.S. PATENT DOCUMENTS

| | | |
|---|---|---|
| 2006/0121694 A1 | 6/2006 | Tamura |
| 2007/0059854 A1 | 3/2007 | Huang et al. |
| 2007/0091062 A1 | 4/2007 | French et al. |
| 2010/0203296 A1 | 8/2010 | Tsai et al. |
| 2012/0082925 A1* | 4/2012 | Wang et al. .................. 430/7 |

FOREIGN PATENT DOCUMENTS

| | | | |
|---|---|---|---|
| CN | 101833215 A * | 9/2010 | ............ C09J 163/00 |
| TW | I287298 | 9/2007 | |
| TW | 201030693 | 8/2010 | |
| TW | 201102696 | 1/2011 | |

OTHER PUBLICATIONS

"Office Action of China Counterpart Application", issued on Jan. 6, 2014, p. 1-8.

"First Office Action of China Counterpart Application", issued on Jun. 5, 2013, p. 1-8.

* cited by examiner

FABRICATING METHOD OF FLEXIBLE DISPLAY AND FLEXIBLE DISPLAY

CROSS-REFERENCE TO RELATED APPLICATION

This application claims the priority benefit of Taiwan application serial no. 100133989, filed on Sep. 21, 2011. The entirety of the above-mentioned patent application is hereby incorporated by reference herein and made a part of this specification.

BACKGROUND OF THE INVENTION

1. Field of the Invention

The invention relates to a display and a fabricating method thereof. More particularly, the invention relates to a flexible display and a fabricating method thereof.

2. Description of Related Art

With rapid development of display technologies, conventional cathode ray tube (CRT) displays have been gradually replaced by flat panel displays (FPD). In comparison with the FPD formed by a solid carrier (e.g. a glass substrate), a flexible display in which an active device is formed on a flexible substrate has been developed according to recent researches because the flexible substrate (e.g. a plastic substrate) is characterized by flexibility and impact endurance.

Typically speaking, in a fabricating method of a flexible display, the flexible substrate is first fixed on the glass carrier. The fabrication process of the display device is performed on the flexible substrate thereafter. After the display device has been fabricated to form the display, the flexible display is retrieved from the glass carrier by releasing the flexible substrate from the glass carrier. The release methods which have been proposed include forming a release layer between the glass carrier and the flexible substrate, so that after the display device has been fabricated, the back of the glass carrier is scanned by laser so the release layer produces gases between the glass carrier and the flexible substrate due to the absorption energies. Accordingly, the flexible substrate can be separated from the glass carrier by the gaps formed by the gases. However, a laser process not only increases the manufacturing cost of the display, but also damages the transistors in the display and causes the device characteristics of the display to deteriorate.

SUMMARY OF THE INVENTION

The invention provides a fabrication method of a flexible display. The fabrication method includes a simple release step and low manufacturing cost.

The invention also provides a flexible display having preferable device characteristics.

In the invention, a fabricating method of a flexible display is provided. First, a release layer is formed on a carrier substrate. The release layer is patterned to form a patterned release layer. Thereafter, a flexible substrate is formed on the patterned release layer. The flexible substrate covers the patterned release layer, and a portion of the flexible substrate contacts the carrier substrate, in which an adhesive force between the patterned release layer and the flexible substrate is larger than an adhesive force between the patterned release layer and the carrier substrate. A device layer is then formed on the flexible substrate. Thereafter, a display layer is formed on the device layer. The flexible substrate and the patterned release layer are then cut simultaneously. The patterned release layer being cut is separated from the carrier substrate, in which the flexible substrate, the device layer and the display layer which have been cut are sequentially disposed on the separated patterned release layer.

The invention also provides a flexible display, including a flexible substrate, a patterned release layer, a device layer, and a display layer. The flexible substrate has a first surface and a second surface opposite to the first surface. The release layer is disposed on the first surface of the flexible substrate, and a material of the release layer includes amorphous silicon. The device layer is disposed on the second surface of the flexible substrate. The display layer is disposed on the device layer.

In summary, according to embodiments of the invention, since the adhesive force between the patterned release layer and the flexible substrate is larger than the adhesive force between the patterned release layer and the carrier substrate, the patterned release layer and the films disposed thereon can be easily released from the carrier substrate to form the flexible display including the patterned release layer. Moreover, because the release step of the flexible display from the carrier substrate does not require the use of high energy processes such as a laser process, the manufacturing cost of the flexible display can be reduced, and damage to the devices in the flexible display can be prevented. Accordingly, the flexible display has preferable device characteristics.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

FIGS. 1A to 1F are schematic top views illustrating a fabricating method of a flexible display according to an embodiment of the invention, and FIGS. 2A to 2F are respective schematic cross-sectional views taken along a line I-I' line depicted in FIG. 1A to FIG. 1F. Please refer to FIGS. 1A and 2A. First, a release layer 102 is formed on a carrier substrate 100. In the present embodiment, no other films are disposed between the carrier substrate 100 and the release layer 102, for example. The carrier substrate 100 may be a substrate having a high rigidity, a low coefficient of expansion, and a high young's modulus. In the present embodiment, the carrier substrate 100 may be an inorganic substrate, such as a glass substrate. A material of the release layer 102 may be a transparent or an opaque material, such as amorphous silicon. The release layer 102 may be formed by a deposition process such as a chemical vapor deposition (CVD) process, or by other suitable methods, and a process temperature may be 200° C., for example. A thickness of the release layer 102 may be between 100 angstroms to 4000 angstroms, for instance, and the thickness is more preferably about 2000 angstroms.

Figure 1A:
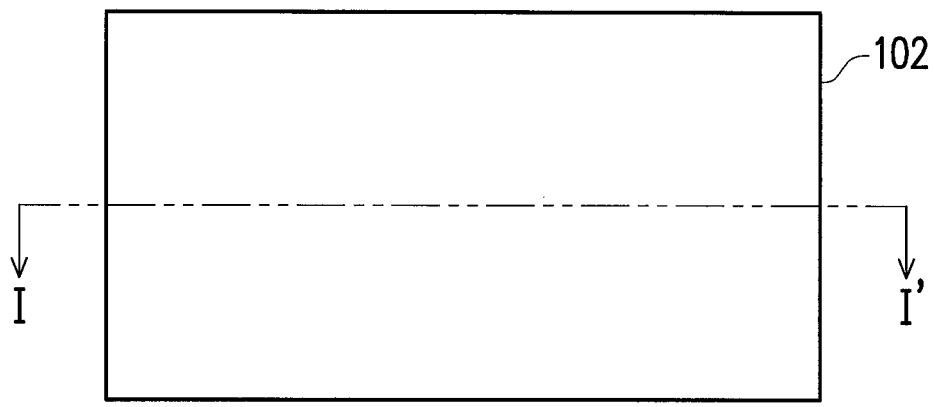
FIGS. 1A to 1F are schematic top views illustrating a fabricating method of a flexible display according to an embodiment of the invention.
Figure 1B:
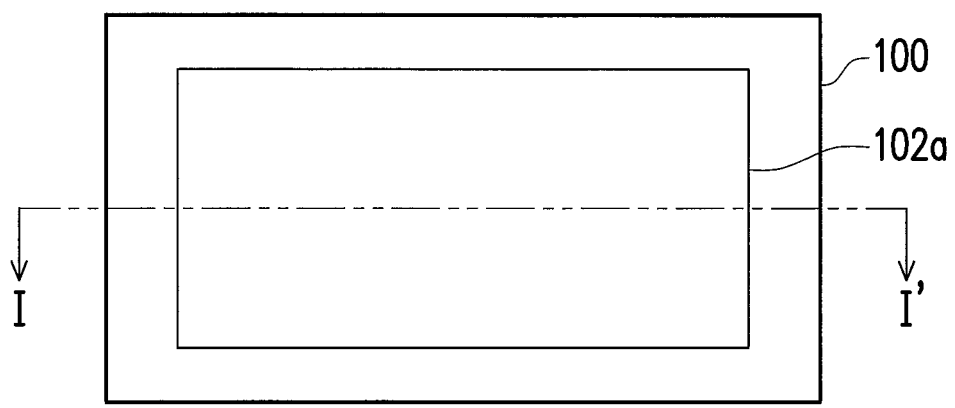
Figure 2A:
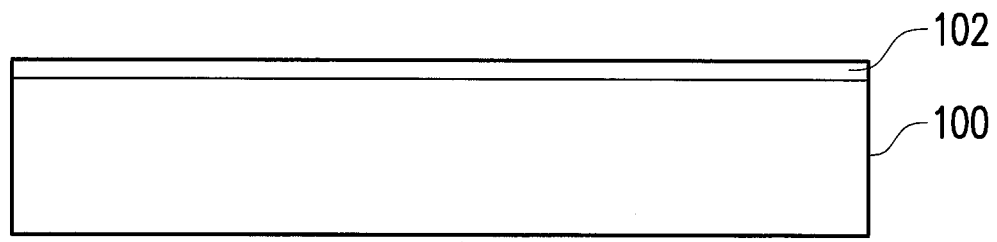
FIGS. 2A to 2F are respective schematic cross-sectional views taken along a line I-I' line depicted in FIG. 1A to FIG. 1F.
Figure 2B:
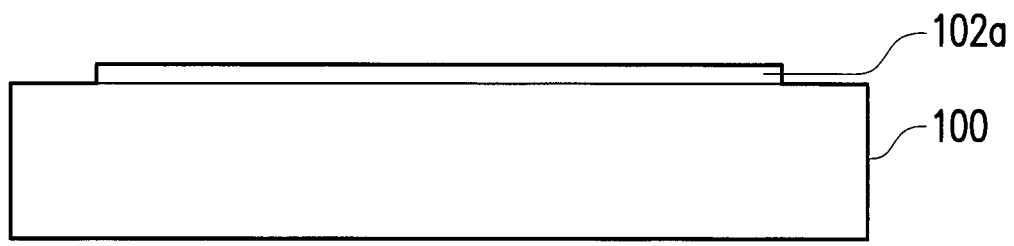

Referring to FIGS. 1B and 2B, the release layer 102 is patterned to for form a patterned release layer 102a. The release layer 102 may be patterned by a lithography and etching process, for example, to remove a portion of the release layer 102. In the present embodiment, the patterned release layer 102a may expose a peripheral area of the carrier substrate 100, for instance.

Figure 1C:
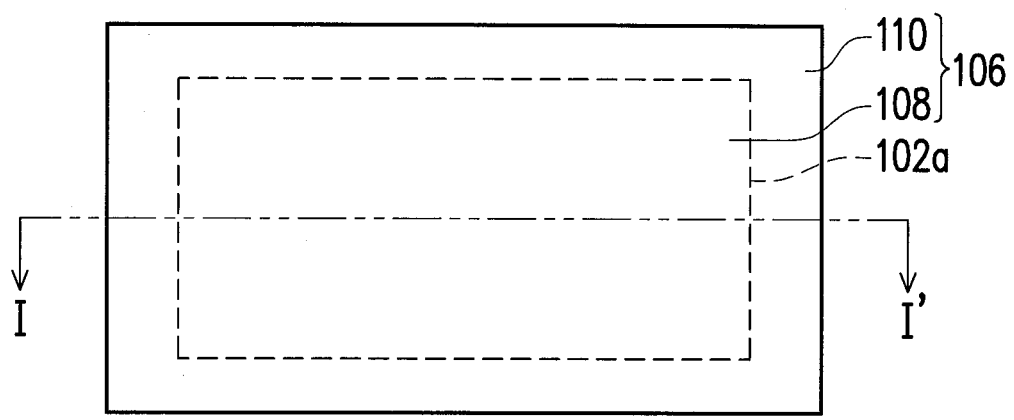
Figure 2C:
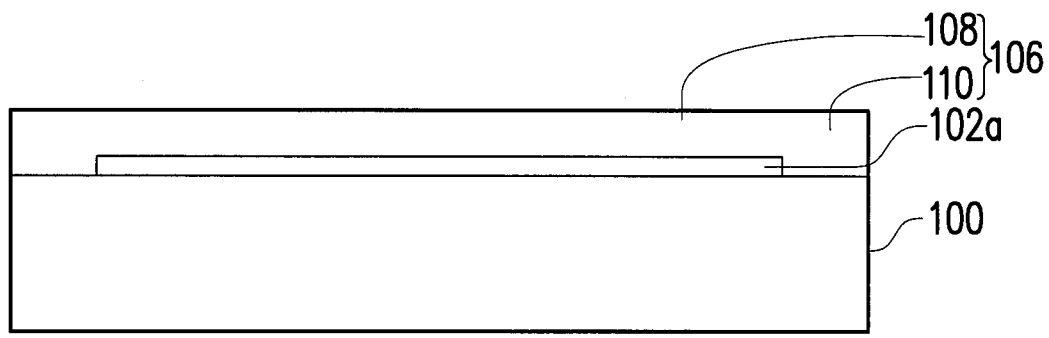

Referring to FIGS. 1C and 2C, in FIG. 1C a dotted line is used to represent the patterned release layer 102a covered by a flexible substrate 106. Thereafter, the flexible substrate 106 is formed on the patterned release layer 102a. The flexible substrate 106 covers the patterned release layer 102a, and a portion of the flexible substrate 106 contacts the carrier substrate 100. Moreover, an adhesive force between the patterned release layer 102a and the flexible substrate 106 is larger than an adhesive force between the patterned release layer 102a and the carrier substrate 100. In the present embodiment, the flexible substrate 106 may be an organic substrate such as a polyimide substrate, for instance. The flexible substrate 106 is formed by a coating process, for example. In the present embodiment, after forming the flexible substrate 106, the fabricating method further includes performing a baking process to eliminate moisture, in which a process temperature of the baking process is between 100° C. to 250° C., and more preferably the process temperature is about 220° C.

In the present embodiment, the flexible substrate 106 may include a central area 108 and a peripheral area 110 surrounding the central area 108. The central area 108 may cover the patterned release layer 102a, for example, and the peripheral area 110 may contact the peripheral area of the carrier substrate 100. Moreover, an adhesive force between the flexible substrate 106 and the carrier substrate 100 is preferably larger than an adhesive force between the patterned release layer 102a and the carrier substrate 100. It should be noted that, since the adhesive force between the patterned release layer 102a and the carrier substrate 100 is small, the patterned release layer 102a may slip from the carrier substrate 100. In the present embodiment, the flexible substrate 106 covers the patterned release layer 102a and contacts the carrier substrate 100, such that the patterned release layer 102a can be temporarily fixed on the carrier substrate 100.

It should be noted that, in one embodiment of the invention, when the carrier substrate 100 is a glass substrate, the patterned release layer 102a is an amorphous silicon layer (inorganic materials) formed by a CVD process, and the flexible substrate 106 is a polyimide substrate (organic materials) formed by a coating process, since a preferable adhesive force exists between the organic group (e.g. polyimide) of the flexible substrate 106 and the atoms (e.g. silicon atoms) of the patterned release layer 102a, the adhesive force between the patterned release layer 102a and the flexible substrate 106 is larger than the adhesive force between the patterned release layer 102a and the carrier substrate 100.

Figure 1D:
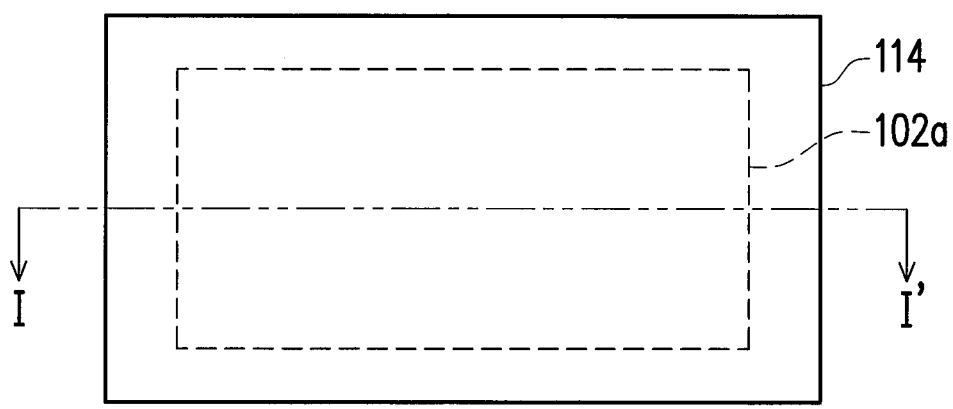
Figure 2D:
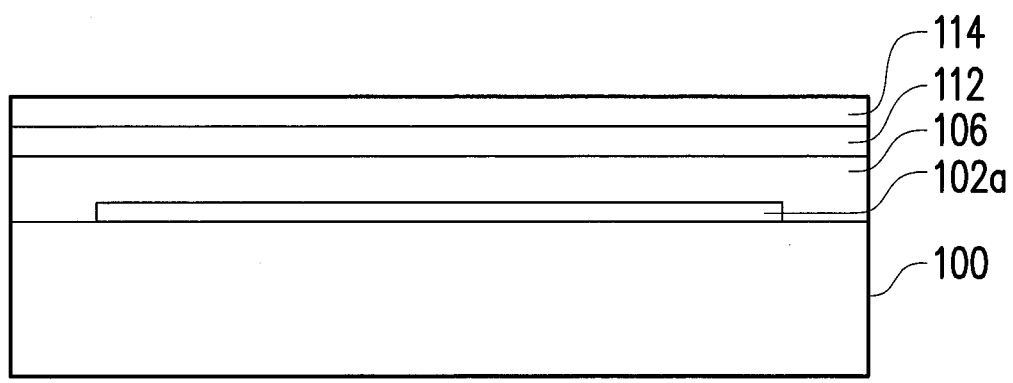

Referring to FIGS. 1D and 2D, in FIG. 1D a dotted line is used to represent the patterned release layer 102a covered by the flexible substrate 106. Thereafter, a device layer 112 is formed on the flexible substrate 106. The device layer 112 may include an active driving device such as an amorphous silicon thin film transistor (TFT), a microcrystalline silicon TFT, an oxide transistor, and a low temperature poly-silicon thin film transistor (LTPS-TFT). In the present embodiment, the peripheral area (not labeled) of the device layer 112 may be an inactive area, for example. The fabrication of a device layer 112 having an oxide transistor is used as an illustrative example. The fabrication process includes, for example, the steps of sequentially forming a buffer layer (not drawn), a gate layer (not drawn), a gate insulation layer (not drawn), a channel layer (not drawn), an etch stop layer (not drawn), a source and drain layer (not drawn), a passivasion layer (not drawn), a pixel electrode layer (not drawn), and a passivasion layer (not drawn) on the flexible substrate 106.

Next, a display layer 114 is formed on the device layer 112. The display layer 114 may be an electrophoretic display film, an organic electroluminescence display device, an organic electroluminescence illumination device, a liquid crystal layer having a color filter film thereon (e.g., twisted nematic (TN) liquid crystal, super twisted nematic (STN) liquid crystal, or cholesteric liquid crystal), for instance. When the display layer 114 is a film (e.g. electrophoretic display film) having display devices formed thereon, the display layer 114 is disposed on the device layer 112 by an adhering process, for example. On the other hand, a display layer 114 having display devices may also be directly fabricated on the device layer 112. Typically speaking, the peripheral area of the display layer 114 is an inactive area, for example. In the present embodiment, after forming the device layer 112 and before forming the display layer 114, the fabricating method may include performing a baking process, in which a process temperature of the baking process is between 200° C. to 350° C., and more preferably the process temperature is about 220° C.

Figure 1E:
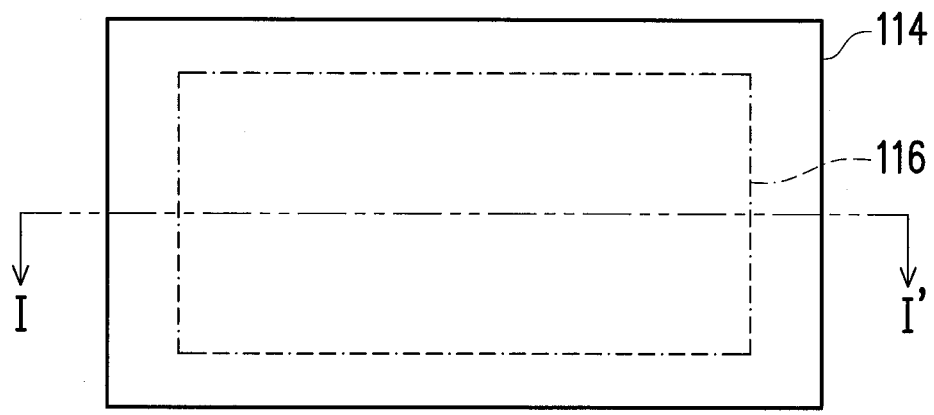
Figure 2E:
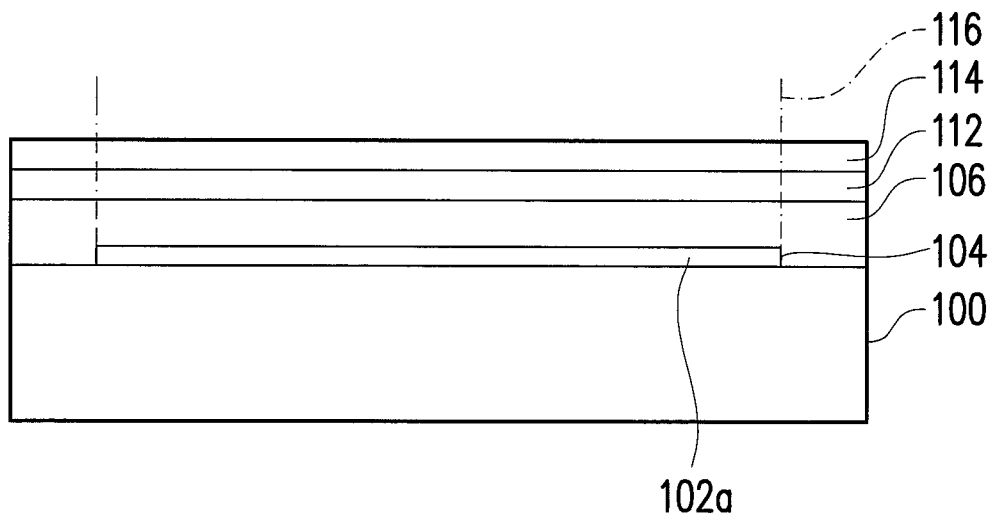

Referring to FIGS. 1E and 2E, the flexible substrate 106 and the patterned release layer 102a are then simultaneously cut. In the present embodiment, the step of cutting the flexible substrate 106 and the patterned release layer 102a is performed along a cutting path 116, for example, in which the cutting path 116 corresponds to an outer edge 104 of the patterned release layer 102a, for instance. In another embodiment, the cutting path 116 may not correspond to the outer edge 104 of the patterned release layer 102a, but rather the cutting step may be performed along a cutting path corresponding to an inner area of the patterned release layer 102a. Typically speaking, although the cutting step simultaneously cuts the peripheral areas of the device layer 112 and the display layer 114, since these peripheral areas correspond to inactive areas, the functions provided by the films are not affected.

Figure 1F:
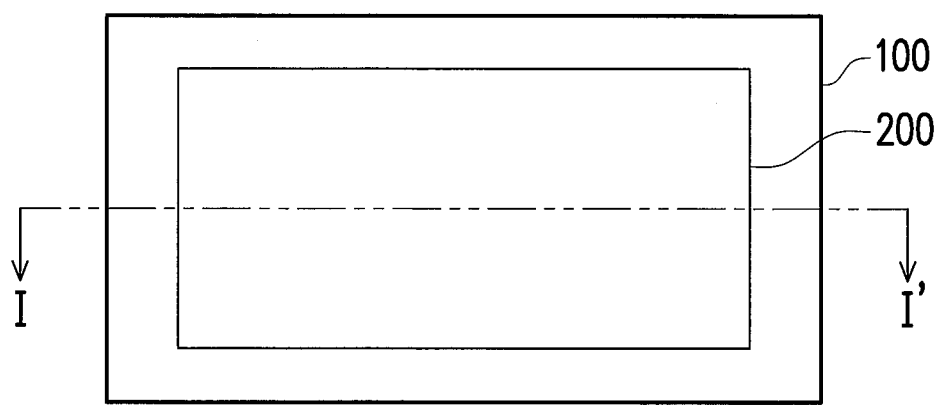
Figure 2F:
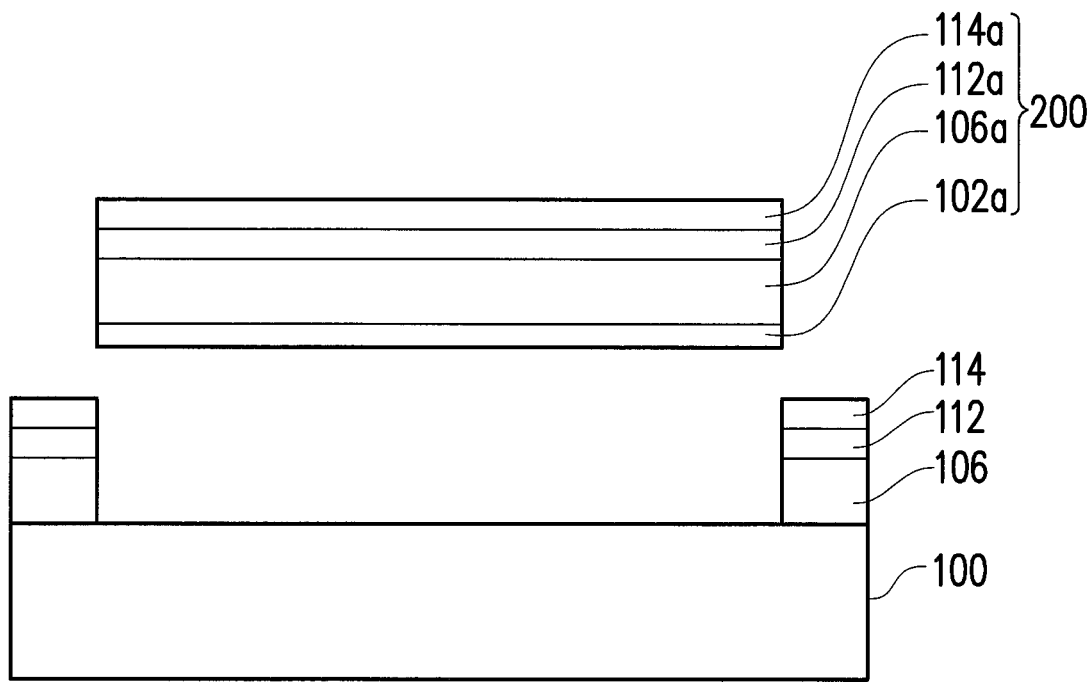

Thereafter, referring to FIGS. 1F and 2F, the patterned release layer 102a being cut is separated from the carrier substrate 100, so as to form a flexible display 200. The flexible display 200 includes the patterned release layer 102a, as well as a flexible substrate 106a, a device layer 112a, and a display layer 114a which have been cut that are sequentially disposed on the patterned release layer 102a. In the present embodiment, a suction tool may be employed to suck the display layer 114a above the patterned release layer 102a, so the patterned release layer 102a is separated from the carrier substrate 100. Alternatively, the patterned release layer 102a may be separated from the carrier substrate 100 by a shovel, an air knife, a line, or other methods through an interface between the patterned release layer 102a and the carrier substrate 100. In the present embodiment, after separating the flexible display 200 and the carrier substrate 100, the carrier substrate 100 has, for example, no other films disposed thereon.

In the present embodiment, since the portion of the carrier substrate 100 and the flexible substrate 106 directly contacting each other has been removed in the step of cutting the flexible substrate 106 and the patterned release layer 102a, the extra external force for fixing the patterned release layer 102a on the carrier substrate 100 no longer substantially exists. Moreover, since the adhesive force between the patterned release layer 102a and the flexible substrate 106a is larger than the adhesive force between the patterned release layer 102a and the carrier substrate 100, the adhesive force between the patterned release layer 102a and the flexible substrate 106a substantially serves as a main pulling force for removing the patterned release layer 102a from the carrier substrate 100. In other words, the afore-described release method is substantially used for releasing the patterned release layer 102a from the surface of the carrier substrate 100, and not for destroying the adhesive force between the patterned release layer 102a and the carrier substrate 100. Therefore, these release methods almost entirely do away with high energy related processes (e.g. laser processes), so as to avoid the release methods damaging the devices in the device layer 112a and the display layer 114a, and thus the flexible display 200 has preferable device characteristics. Moreover, the flexible display 200 also has a simple fabrication process and a low manufacturing cost.

In the present embodiment, since the patterned release layer 102a adheres to flexible substrate 106a after being released, the patterned release layer 102a may serve as a passivasion layer for preventing moisture from entering the flexible display 200. Accordingly, the device characteristics of the flexible display 200 can be enhanced, making the fabrication method especially suitable for fabricating an active matrix organic light emitting diode (AMOLED) display. It should be noted that, although the foregoing embodiment form a single flexible display 200 by way of example, the invention is not limited thereto. In one embodiment (not drawn), a plurality of flexible displays may be simultaneously fabricated.

Figure 3:
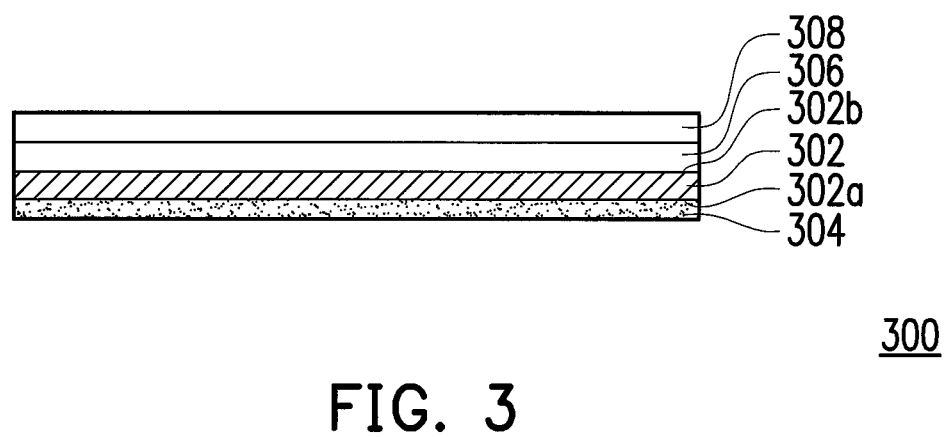
FIG. 3 is a schematic cross-sectional view of a flexible display according to another embodiment of the invention.

FIG. 3 is a schematic cross-sectional view of a flexible display according to another embodiment of the invention. A flexible display 300 may be formed by a fabrication method described in a previous embodiment. Moreover, since the structure of the flexible display 300 is substantially the same as the structure of the flexible display 200, and description of the identical elements may be referenced to the previous embodiments. The relationships between the elements in the flexible display 300 are described below. The flexible display 300 includes a flexible substrate 302, a release layer 304, a device layer 306, and a display layer 308. The flexible substrate 302 has a first surface 302a and a second surface 302b opposite to the first surface 302a. In the present embodiment, the flexible substrate 302 may be an organic substrate such as a polyimide substrate. The release layer 304 is disposed on the first surface 302a of the flexible substrate 302, and a material of the release layer 304 includes amorphous silicon. A thickness of the release layer 304 may be between 100 angstroms to 4000 angstroms, for instance, and the thickness is more preferably about 2000 angstroms.

The device layer 306 is disposed on the second surface 302b of the flexible substrate 302. The device layer 306 may be a TFT array. The display layer 308 is disposed on the device layer 306. The display layer 308 may be a liquid crystal layer, an electrophoretic display film, an organic electroluminescence display device, or an organic electroluminescence illumination device. In other words, the flexible display 300 may be a liquid crystal display, an AMOLED display, or an electrophoretic display (EPD).

In the present embodiment, the release layer 304 including amorphous silicon has a moisture resistance function and is capable of preventing moisture from damaging the devices in the flexible display 300. Accordingly, the flexible display 300 has preferable device characteristics and a long lifetime.

In view of the foregoing, the fabrication method of the flexible display according to embodiments of the invention utilizes the differences between adhesive forces to separate the patterned release layer from the carrier substrate, so the flexible display including the patterned release layer can easily come off the carrier substrate. In other words, since the adhesive force between the patterned release layer and the flexible substrate is larger than the adhesive force between the patterned release layer and the carrier substrate, the separation step of the flexible display from the carrier substrate does not require high energy processes such as a laser process. Accordingly, the manufacturing cost of the flexible display can be reduced, and damage done by the separation method to the devices in the device layer and the display layer can be prevented. Moreover, since the patterned release layer is released from the carrier substrate along with the flexible substrate, the patterned release layer can serve as a passivasion layer in the flexible display for preventing moisture from entering the flexible display. Therefore, the device characteristics and the lifetime of the flexible display can be enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fabricating method of a flexible display, comprising:
    forming a release layer on a carrier substrate;
    patterning the release layer to form a patterned release layer;
    forming a flexible substrate on the patterned release layer, the flexible substrate covering the patterned release layer and contacting a lateral side of the patterned release layer and a portion of the flexible substrate contacting the carrier substrate, wherein an adhesive force between the patterned release layer and the flexible substrate is larger than an adhesive force between the patterned release layer and the carrier substrate, and the flexible substrate is a single layer;
    forming a device layer on the flexible substrate;
    forming a display layer on the device layer;
    simultaneously cutting the flexible substrate and the patterned release layer; and
    separating the patterned release layer being cut from the carrier substrate, wherein the flexible substrate, the device layer, and the display layer which have been cut are sequentially disposed on the patterned release layer being separated.

2. The fabricating method of the flexible display as claimed in claim 1, wherein a material of the release layer comprises an inorganic material.

3. The fabricating method of the flexible display as claimed in claim 1, wherein a material of the release layer comprises amorphous silicon.

4. The fabricating method of the flexible display as claimed in claim 1, wherein the release layer is formed by a deposition process.

5. The fabricating method of the flexible display as claimed in claim 1, wherein the carrier substrate is an inorganic substrate.

6. The fabricating method of the flexible display as claimed in claim 1, wherein the flexible substrate is an organic substrate.

7. The fabricating method of the flexible display as claimed in claim 1, wherein the carrier substrate is a glass substrate, and the flexible substrate is a polyimide substrate.

8. The fabricating method of the flexible display as claimed in claim 1, wherein the flexible substrate is formed by a coating process.

9. The fabricating method of the flexible display as claimed in claim 1, wherein an adhesive force between the flexible substrate and the carrier substrate is larger than the adhesive force between the patterned release layer and the carrier substrate.

10. The fabricating method of the flexible display as claimed in claim 1, wherein the flexible substrate comprises a central area and a peripheral area surrounding the central area, the central area covers the patterned release layer, and the peripheral area contacts the carrier substrate.

11. The fabricating method of the flexible display as claimed in claim 1, wherein the step of simultaneously cutting the flexible substrate and the patterned release layer is performed along an outer edge of the patterned release layer.

12. The fabricating method of the flexible display as claimed in claim 1, wherein the step of simultaneously cutting the flexible substrate and the patterned release layer is performed along an inner area of the patterned release layer.

13. The fabricating method of the flexible display as claimed in claim 1, wherein a thickness of the patterned release layer is between 100 angstroms to 4000 angstroms.

14. The fabricating method of the flexible display as claimed in claim 1, wherein the flexible substrate consists of a single material.

* * * * *